United States Patent
Gandolph et al.

(10) Patent No.: US 7,657,109 B2
(45) Date of Patent: Feb. 2, 2010

(54) METHOD FOR RUN-LENGTH ENCODING OF A BITMAP DATA STREAM

(75) Inventors: Dirk Gandolph, Ronnenberg (DE); Jobst Hörentrup, Hannover (DE); Axel Kochale, Springe (DE); Ralf Ostermann, Hannover (DE); Hartmut Peters, Barsinghausen (DE)

(73) Assignee: Thomson Licensing, Boulogne-Billancourt (FR)

( * ) Notice: Subject to any disclaimer, the term of this patent is extended or adjusted under 35 U.S.C. 154(b) by 671 days.

(21) Appl. No.: 10/561,984

(22) PCT Filed: May 6, 2004

(86) PCT No.: PCT/EP2004/004794

§ 371 (c)(1),
(2), (4) Date: Dec. 21, 2005

(87) PCT Pub. No.: WO2005/006736

PCT Pub. Date: Jan. 20, 2005

(65) Prior Publication Data

US 2006/0140496 A1   Jun. 29, 2006

(30) Foreign Application Priority Data

Jul. 1, 2003   (EP) .................................. 03014970

(51) Int. Cl.
*G06K 9/36* (2006.01)
*G06K 9/46* (2006.01)

(52) U.S. Cl. ........................... 382/245; 382/166

(58) Field of Classification Search ................. 382/166, 382/233, 245; 348/468
See application file for complete search history.

(56) References Cited

U.S. PATENT DOCUMENTS 5,740,278 A * 4/1998 Berger et al. ................ 382/232

OTHER PUBLICATIONS

J. Jeong et al.: "Adaptive Huffman coding of 2-D DCT coefficients for image sequence compression", Signal Processing, Image Communication, Elsevier Science Publishers, Amsterdam, NL, vol. 7, No. 1, Mar. 1, 1995, pp. 1-11.

(Continued)

*Primary Examiner*—Phuoc Tran
(74) *Attorney, Agent, or Firm*—Robert D. Shedd; Paul P. Kiel; Guy H. Eriksen

(57) ABSTRACT

Subtitling aims at the presentation of text information and graphical data, encoded as pixel bitmaps. The size of subtitle bitmaps may exceed video frame dimensions, so that only portions are displayed at a time. The bitmaps are a separate layer lying above the video, e.g. for synchronized video subtitles, animations and navigation menus, and therefore contain many transparent pixels. An advanced adaptation for bitmap encoding for HDTV, e.g. 1920×1280 pixels per frame as defined for the Blu-ray Disc Prerecorded format, providing optimized compression results for such subtitling bitmaps, is achieved by a four-stage run length encoding. Shorter or longer sequences of pixels of a preferred color, e.g. transparent, are encoded using the second or third shortest code words, while single pixels of different color are encoded using the shortest code words, and sequences of pixels of equal color use the third or fourth shortest code words.

6 Claims, 4 Drawing Sheets

OTHER PUBLICATIONS

T. von Roden: "H.261 and MPEG1-a comparison" Computers and Communications, 1996, Conference Proceedings of the 1996 IEEE Fifteenth Annual International Phoenix Conference on Scottsdale, AZ, USA, Mar. 27-29, 1996, pp. 65-71.

R. Llados-Bernaus et al: "Codeword assignment for fixed-length entropy coded video streams" Data Compression Conference, 1998, DCC'98 Proceedings Snowbird, UT, USA Mar. 30-Apr. 1, 1998, pp. 269-278.

Search Report Dated Sep. 15, 2004.

* cited by examiner

| Code | Meaning |
|---|---|
| CCCCCCCC | One pixel in color C (1 ≤ C ≤ 255) |
| 00000000 00LLLLLL | L pixels in color 0 (1 ≤ L ≤ 63) |
| 00000000 01LLLLLL LLLLLLLL | L pixels in color 0 (64 ≤ L ≤ 16383) |
| 00000000 10LLLLLL CCCCCCCC | L pixels in color C (3 ≤ L ≤ 63, 1 ≤ C ≤ 255) |
| 00000000 11LLLLLL LLLLLLLL CCCCCCCC | L pixels in color C (64 ≤ L ≤ 16383, 1 ≤ C ≤ 255) |
| 00000000 00000000 | end of line |
| Possible extensions | |
| 00000000 10000000 X<br>00000000 10000001 X<br>00000000 10000010 X<br>00000000 01000000 00000000 X<br>00000000 01000000 …<br>00000000 01000000 00011111 X | |

Fig. 3

| Syntax | Size [bit] | Type |
|---|---|---|
| extended_object_data_segment() { | | |
|   sync_byte | 8 | bslbf |
|   segment_type | 8 | bslbf |
|   page_id | 16 | bslbf |
|   segment_length | 16 | uimsbf |
|   first_in_sequence | 1 | bslbf |
|   last_in_sequence | 1 | bslbf |
|   reserved | 6 | bslbf |
|   if (first_in_sequence == '1') { | | |
|     object_width | 16 | uimsbf |
|     object_height | 16 | uimsbf |
|   } | | |
|   object_data_piece() | | |
| } | | |

Fig. 4

METHOD FOR RUN-LENGTH ENCODING OF A BITMAP DATA STREAM

FIELD OF THE INVENTION

This invention relates to a method for encoding a data stream, particularly a bitmap coded subtitling data stream.

BACKGROUND

Broadcast or read-only media containing video data may also comprise subpicture data streams, containing textual or graphical information needed to provide subtitles, glyphs or animation for any particular purpose, e.g. menu buttons. Since displaying of such information may usually be enabled or disabled, it is overlaid on the associated video image as an additional layer, and is implemented as one or more rectangular areas called regions. Such region has specified a set of attributes, like e.g. area size, area position or background color. Due to the region being overlaid on the video image, its background is often defined to be transparent so that the video image can be seen, or multiple subpicture layers can be overlaid. Further, a subtitle region may be broader than the associated image, so that only a portion of the subtitle region is visible, and the visible portion of the region is shifted e.g. from right to left through the whole subtitle area, which looks as if the subtitles would shift through the display. This method of pixel based subtitling is described in the European Patent application EP02025474.4 and is called cropping. Subtitles were originally meant as a support for handicapped people, or to save the costs for translating a film into rarely used languages, and therefore for pure subtitle text it would be enough if the subtitle data stream contained e.g. ASCII coded characters. But subtitles today contain also other elements, up to high-resolution images, glyphs or animated graphical objects. Handling of such elements is easier if the subtitling stream is coded in bitmap format, with the lines of an area and the pixels within a line being coded and decoded successively. This format contains much redundancy, e.g. when successive pixels have the same color value. This redundancy can be reduced by various coding methods, e.g. run-length encoding (RLE). RLE is often used when sequences of data have the same value, and its basic ideas are to code the sequence length and the value separately, and to code the most frequent code words as short as possible.

Particularly when encoding the subtitle layer for 1920× 1280 pixels high-definition video (HDTV), a coding algorithm that is optimized for this purpose is needed to reduce the required amount of data.

SUMMARY OF THE INVENTION

The purpose of the invention is to disclose a method for optimized encoding of subtitle or subpicture layers for high-resolution video, such as HDTV, being represented as bitmap formatted areas that may be much broader than the visible video frame.

According to the invention, four-stage run-length encoding (RLE) is used for this purpose, with the shortest code words being used for single pixels having individual color values other than transparent, the second shortest code words being used for shorter sequences of transparent pixels, the third shortest code words being used for longer sequences of transparent pixels and shorter sequences of pixels of equal color other than transparent, and the fourth shortest code words being used for longer sequences of pixels of equal color other than transparent. Usually, most of the pixels within the subtitle layer are transparent. Other than for conventional RLE, where the most frequent data use the shortest code words, this method comprises using the second shortest code words for short sequences of the most frequent color, and the third shortest code words for longer sequences of the most frequent color and also short sequences of other colors. Shortest code words are reserved for single pixels of other than the most frequent color. This is advantageous when pixels of the most frequent color almost always appear in sequences, as being the case for transparent pixels in the subtitle layer, while single pixels of individual color are more likely to be not transparent.

Advantageously, a code according to the inventive method incorporates only few redundant code words, which are defined to be among the longer code words. E.g. a single pixel of any color other than transparent is ideally coded with a code word of the shortest type, but a code word of the third shortest type may be used as well, with the sequence length being one. Though the latter possibility will usually not be used for this purpose, these unused code words, or gaps in the code word space, can be used for transportation of other information. An example is the end-of-line information that can be used for resynchronization. According to the invention, the shortest redundant code word is used to code this information.

As another advantage, the disclosed method reduces the amount of required data, thus compressing the subtitle data stream, with the compression factor depending on the contents of the data stream. Particular high compression factors are achieved for data combinations that appear very often in typical subtitling streams. These are sequences of length shorter than e.g. 64 pixels that have the same color value, but also sequences of transparent pixels having any length and single pixels having individual color values. The first of these groups are often used in characters or glyphs, the second of these groups is used before, between and after the displayed elements of the subtitling stream, and the third of these groups is used in images, or areas with slightly changing color. Since transparent pixels hardly ever appear in very short sequences, e.g. less than three pixels, it is sufficient to code them not with the shortest but only with the second shortest code words.

Simultaneously, the inventive method may handle efficiently sequences that are longer than 1920 pixels, and e.g. may be up to 16383 pixels long, thus enabling very wide subtitling areas.

Further, the coding method generates a unique value representing the end of a line, and therefore in the case of loss of synchronization it is possible to resynchronize each line.

Advantageously, the inventive method is optimized for coding this combination of a number of features being typical for subtitling streams.

Therefore the amount of data required for the subtitling stream may be reduced, which leads to better utilization of transmission bandwidth in the case of broadcast, or to a reduced pick-up jump frequency in the case of storage media where a single pick-up reads multiple data streams, like e.g. in Blu-ray disc (BD) technology. Further, the better the subtitling bitmap is compressed, the higher capacity in terms of bit-rate will be left for audio and video streams, increasing picture or audio quality.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 cropping of a subtitle area in a video frame;

FIG. 3 a coding table for subtitling, including text and graphics;

FIG. 4 a table with an exemplary syntax of an extended object data segment for the Blu-ray Prerecorded standard;

DETAILED DESCRIPTION OF THE INVENTION

Figure 1:
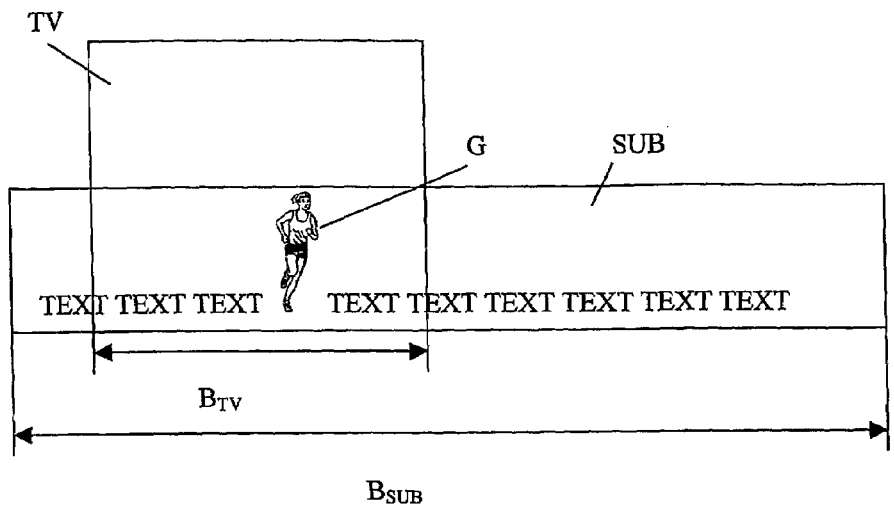

While subtitling in pre-produced audio-visual (AV) material for broadcast or movie discs is primarily optimized for representing simple static textual information, e.g. Closed Caption, Teletext or DVB-Subtitle, progress in multimedia development for presentation and animation of textual and graphic information adequate to new HDTV formats requires an advanced adaptation for bitmap encoding. FIG. 1 shows a video frame TV and a subtitle area SUB containing text and graphical elements G, with the subtitle area SUB being bitmap coded. The size of the subtitle area SUB may exceed the video frame dimensions, as e.g. for the Blu-ray Disc Prerecorded (BDP) format subtitle bitmaps are allowed for one dimension to be larger than the video frame. Then the lines are cropped before being displayed, i.e. a portion matching the respective frame dimension is cut out of the virtual line and displayed, overlaying the video image. In FIG. 1, the subtitle area SUB of width $B_{SUB}$ is cropped, so that only a portion of width $B_{TV}$ is visible. For standard HDTV, as used e.g. for BDP, $B_{TV}$ is 1920 pixels, while $B_{SUB}$ may be much more.

Figure 2:
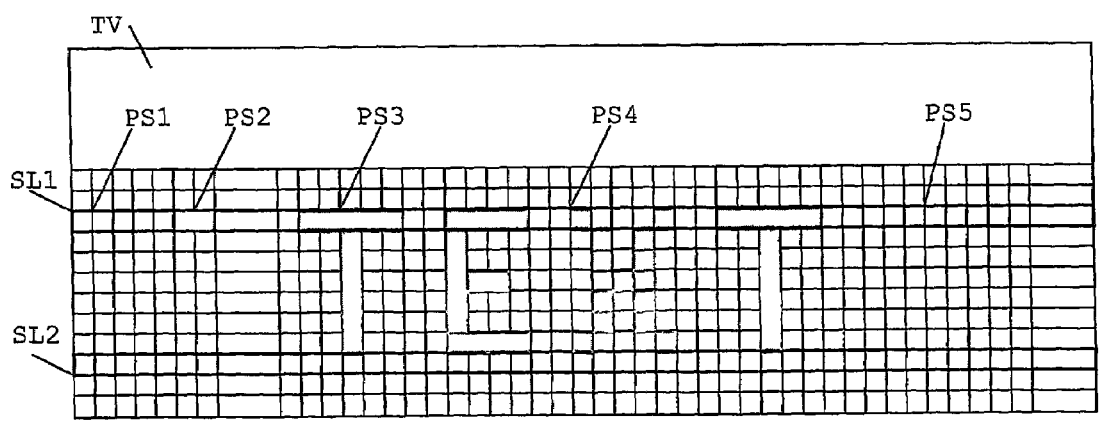
FIG. 2 a pixel sequence in a subtitle area.

Due to the rectangular shape of the subtitle area SUB, most pixels in that area are transparent. This is in an enlarged scale shown in FIG. 2, in a simplified manner since usually a line SL1,SL2 on a HDTV screen TV must be several pixels wide in order to be clearly visible. A line is herein understood as a horizontal structure. Each line of subtitle data usually contains one or more pixel sequences of equal color. FIG. 2 shows a part of a subtitle line SL1 containing transparent sequences PS1,PS5, but also single visible pixels PS4, shorter visible lines PS2 and longer visible lines PS3. Most pixels within a line are transparent. This is the case between characters, but also at the beginning and at the end of subtitling lines. Anyway, since lines begin and end with transparent sections, each line contains one more transparent than colored section. But transparent sections PS1,PS5 are usually longer, while for pixel sequences other than transparent, used e.g. for characters, the most frequent case is a sequence length of 64 or less. This can be recognized from a rough estimation, assuming that at least 25 characters are displayed simultaneously, and that the space between characters has about one quarter the width of a character, so that a single character may use not more than 1920/25*(8/10)=62 pixels within a line. Often, a line SL2 contains only very few visible pixels, and therefore only few transparent sequences that are very long.

A code being a preferred embodiment of the invention is listed in FIG. 3. It is a run-length code, comprising code words of lengths ranging from 1 byte up to 4 bytes, with 8 bits per byte. It is capable of coding 256 different colors, with one preferred color. The preferred color is in this example 'transparent', but may be any other color if adequate. A color look-up table (CLUT) may transform the decoded color values into the actual display color. Further, pixel sequences of equal color may be coded in two ranges, with the shorter range being up to 63 pixels and the longer range being up to 16383 pixels.

The shortest code words of 1 byte length are used to code a single pixel having any individual color other than the preferred color, which is here transparent. The color value CCCCCCCC may range from 1 up to 255, and may represent a color directly or indirectly. E.g. it may represent an entry in a color look-up table (CLUT) that contains the actual color code. One of the 8-bit values, containing only zeros (00000000), serves as an escape sequence, indicating that the following bits have to be considered as part of the same code word. In that case, the code word tree has four possible branches, marked by the two following bits.

In the first branch, indicated by the following bits being 00, valid code words have two bytes, and a shorter sequence of up to 63 pixels is coded having the preferred color, e.g. transparent. The only invalid code word in this branch is the one that comprises only 0's, since 0 represents no valid sequence length. This code word '00000000 00000000' may be used for other purposes. According to the invention, it is used to indicate the end of a line since it is the shortest redundant code word.

In the second branch, indicated by the following bits being $01_b$, the code word comprises another byte, and the fourteen L bits are used to code the length of a pixel sequence of the preferred color, e.g. transparent. Thus, the sequence length may be up to $2^{14}-=16383$. The code words where the L bits have a value below 64 are redundant, and may be used for other purposes.

In the third branch, indicated by the following bits being $10_b$, the code words comprise an additional byte, and the six L bits of the second byte represent the length of a shorter sequence of up to 63 pixels, which have another than the preferred color. The actual color is directly or indirectly represented by the CCCCCCCC value of the third byte. The code words with a sequence length LLLLLL below three are redundant, since a sequence of one or two pixels of this color can be cheaper coded using one byte per pixel, as described above, and a sequence length of zero is invalid. These code words may be used for other purposes. In the fourth branch, indicated by the following bits being $11_b$, the code words comprise two additional bytes, wherein the remaining six bits of the second byte and the third byte give the length of a longer sequence of 64 up to 16383 pixels, and the color value CCCCCCCC of the fourth byte gives the color, directly or indirectly and not being the preferred color. The code words with a sequence length below 64 are redundant, since these sequences may be coded cheaper using the third branch. These code words may be used for other purposes.

The redundant code words mentioned above may be used to extend the code, e.g. add internal check sums or other information.

The extended run-length encoding table shown in FIG. 3 and described above provides mainly two advantages. First, it allows for the most compact encoding of typical subtitle streams, including transparent areas, small graphical objects and normal subtitle text. Single pixels of any color, as used for small colorful graphics, are coded with a single byte. The dominant color, e.g. transparent for BDP subtitling, is always encoded together with a run-length. Run-length codes are available in two different sizes, or two pixel quantities. In a first step, run-lengths of up to 63 pixels are available as 2-byte code words for the dominant color, and as 3-byte code words for the other colors. In a second step, run-lengths of up to 16383 pixels are available as 3-byte code words for the dominant color, and as 4-byte code words for the other colors. The end-of-pixel-string code, or end-of-line code, is a unique 2-byte code word that can be used for resynchronization. Secondly, the availability of longer sequences for the subtitling area, up to 16383 pixels per code word, means a reduction of redundancy, and therefore of the amount of data. This means that for applications with separate data streams sharing one channel, e.g. multiple data streams on an optical storage medium sharing the same pick-up, bigger portions of the subtitling stream may be loaded with the same amount of data, thus reducing the access frequency for the subtitle stream.

Another aspect of the invention is a further optimization of the data stream for transport using transport packets, e.g. in a packetized elementary stream (PES). Due to the large file size of bitmaps, the packaging of such data, e.g. in object data segments (ODS), is a problem. Often the maximum size of an ODS is limited by other factors, e.g. PES packet size. To fit large bitmaps into such packets, it would be necessary to cut bitmaps into small bitmap pieces before coding, which reduces the compression efficiency. To overcome this bitmap splitting, a new extended object data segment (ExODS) for BDP or comparable applications is disclosed, as shown in FIG. 4. ExODS is a data structure representing each of the fragments into which an ODS is cut for fitting it into a sequence of limited size segments and PES packets. The complete ODS can be reconstructed by concatenating the sequence of individual pieces of consecutive ExODSs.

The start and the end of a sequence of ExODS is indicated by separate flags, first_in_sequence and last_in_sequence. When the first_in_sequence flag is 1, a new sequence is starting. An ExODS having set the first_in_sequence flag to 1 also indicates the size of the decompressed bitmap, by containing its dimension object_width and object_height. The advantage of indicating bitmap dimension is the support of target memory allocation before the decompression starts. Another advantage is, that the indicated bitmap dimensions can also be used during decoding for cross checking bitmap dimensions. When the last_in_sequence flag is set to 1, the last ExODS of a complete ODS is indicated. There may be ExODS having set neither the first_in_sequence nor the last_in_sequence flag. These are ExODS pieces in the middle of a sequence. Also the case of having set both, the first_in_sequence flag and the last_in_sequence flag, is possible if the ODS can be carried within a single ExODS. To overcome the limitation in size available for a single ODS by PES packet size within subtitling, the described type of ExODS may be introduced as a container for pieces of one ODS, e.g. for packaging large ODS for HDTV application. Besides the ODS pieces, the ExODS also carries flags indicating if it is carrying the first piece, the last piece, a middle piece or the one but complete piece of an ExODS sequence. Furthermore, if the first piece in sequence of the ExODS is transmitted, the dimensions of the resulting ODS, i.e. height and width of the encoded bitmap, is contained in the segment. The indicated bitmap dimensions can also be used for a decoding cross check.

The inventive method can be used for compression of bitmap data streams containing e.g. text, images or graphics data for animation, menus, navigation, logos, advertisement, messaging or others, in applications such as e.g. Blu-Ray Prerecorded (BDP) discs or generally high-definition video (HDTV) recordings or broadcast.

Figure 5:
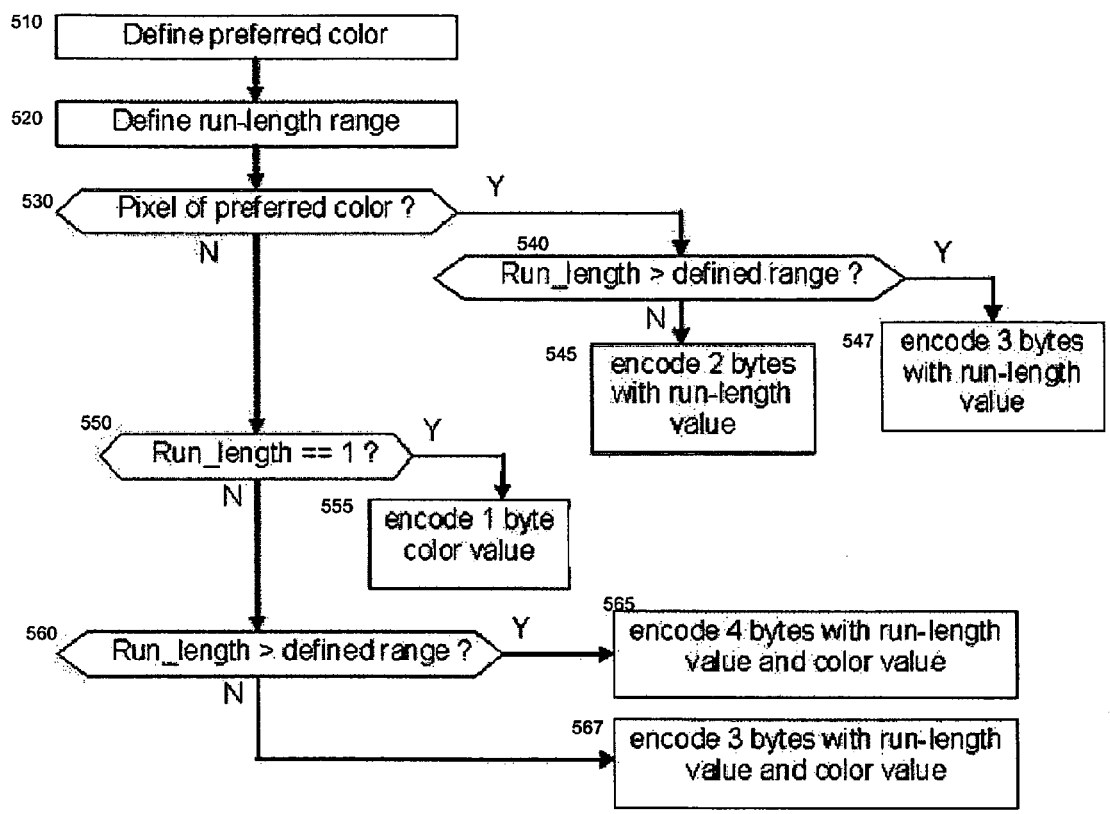
FIG. 5 a flow chart of the encoding method.
Figure 6:
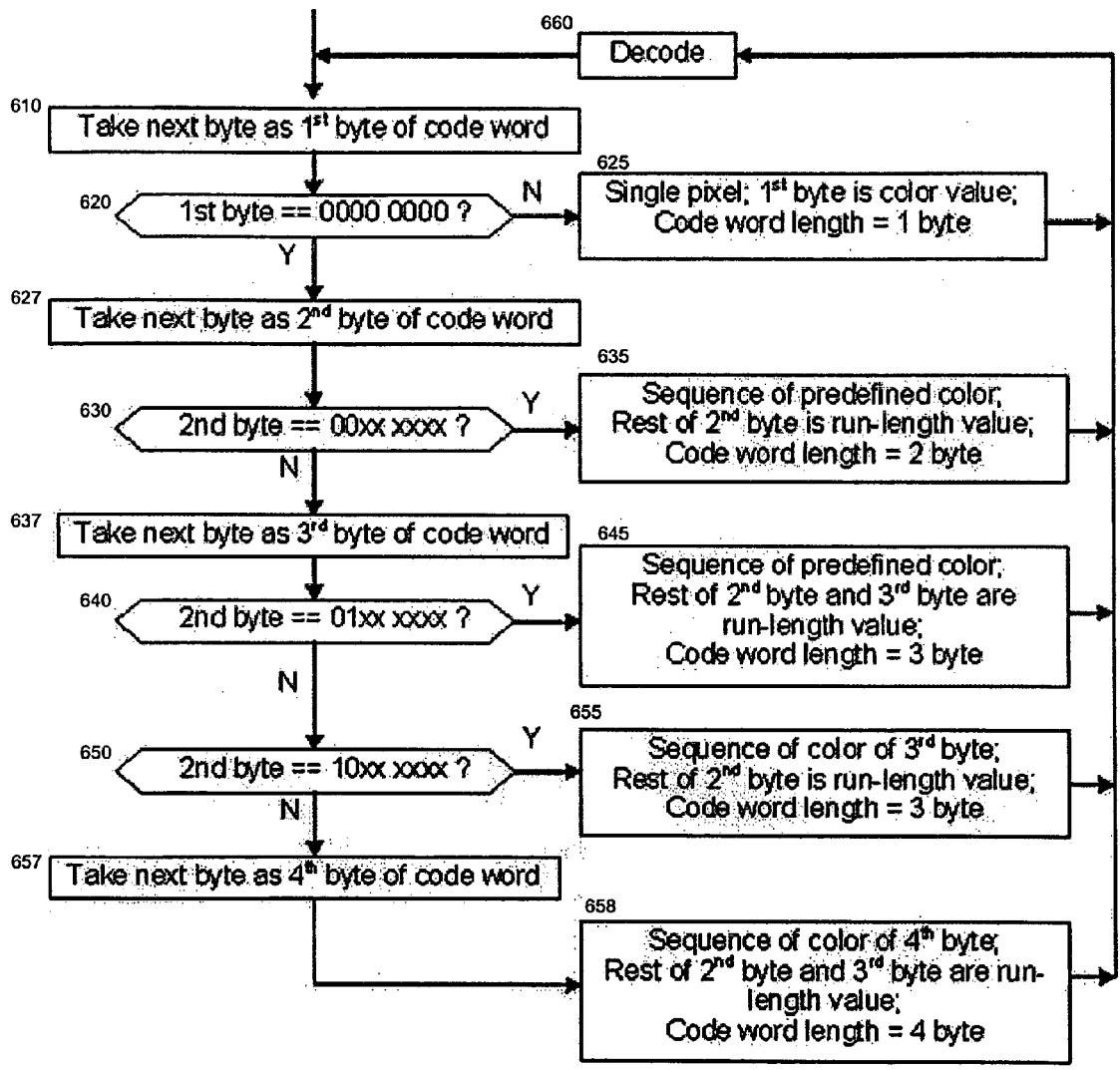

The invention discloses a method for run-length encoding of a data stream comprising bitmap formatted subtitle or menu data for video presentation on a display, wherein the subtitle or menu data include graphics or text or both, as shown in FIG. 5. The method comprises the steps of defining a preferred color 510, and defining a range of run-lengths 520. Pixels of the preferred color are encoded to first code words with two or three bytes, wherein the first code words comprise a run-length value 530 and 540-547. The run-length value comprised in first code words having three bytes exceeds the defined range and may exceed the width of the display 547. Pixels of another than the preferred color are encoded to second code words with one, three or four bytes 550-567, wherein the second code words comprise a color value and second code words having three or four bytes comprise a run-length value. The run-length value comprised in second code words having four bytes exceeds the defined range and may exceed the width of the display 565.

A method for run-length decoding of an encoded data stream for a video presentation on a display is described. The method comprises determining the first byte of a code word. If the first byte does not have a defined first value, the first byte is decoded to a single pixel having its color defined by the value of the first byte, the color being other than a defined first color. If the first byte has the defined first value, the method determines the first and second bits of the following byte (the second byte). If the first and second bits of the second byte have a first value, the remaining bits of the second byte are decoded to a sequence of pixels of the defined first color, wherein the remaining bits of the second byte define the sequence length. If the first and second bits of the second byte have a second value, the remaining bits of the second byte together with the following third byte are decoded to a sequence of pixels of the defined first color, wherein the remaining bits of the second byte and the third byte define the sequence length, and the sequence length may exceed the display width. If the first and second bit of the second byte have a third value, the remaining bits of the second byte together with the third byte are decoded to a sequence of pixels of a another color. The remaining bits of the second byte define the sequence length and the third byte defines the pixels color. If the first and second bit of the second byte have a fourth value, the remaining bits of the second byte together with the third and a following fourth byte are decoded, wherein the remaining bits of the second byte and the third byte define the sequence length and the fourth byte defines the pixel color, and the sequence length may exceed the display width value.

The invention claimed is:

1. A method for run-length encoding of a data stream, the data stream comprising bitmap formatted subtitle or menu data for video presentation on a display, wherein the subtitle or menu data include graphics or text or both, comprising the steps of
    defining a preferred color;
    defining a range of run-lengths;
    encoding pixels of the preferred color to first code words with two or three bytes, wherein said first code words comprise a run-length value, and wherein the run-length value comprised in first code words having three bytes exceeds said defined range and may exceed the width of the display;
    encoding pixels of another than the preferred color to second code words with one, three or four bytes, wherein the second code words comprise a color value, and wherein second code words having three or four bytes comprise a run-length value, and wherein the run-length value comprised in second code words having four bytes exceeds said defined range and may exceed the width of the display.

2. Method according to claim 1, wherein said color values and the preferred color are mapped with a look-up table to display colors.

3. Method according to claim 1, wherein the shortest redundant code word is used for line synchronization.

4. Method for run-length decoding of an encoded data stream for a video presentation on a display, comprising the steps of determining the first byte of a code word;

if said first byte has not a defined first value, decoding said first byte to a single pixel having individual color defined by the value of said first byte, the color being other than a defined first color;

if said first byte has the defined first value, determining the first and second bit of the following byte being the second byte;

if the first and second bit of the second byte have a first value, decoding the remaining bits of the second byte to a sequence of pixels of the defined first color, wherein said remaining bits of the second byte define the sequence length;

if the first and second bit of the second byte have a second value, decoding said remaining bits of the second byte together with the following third byte to a sequence of pixels of the defined first color, wherein said remaining bits of the second byte and said third byte define the sequence length, and wherein said sequence length may exceed the display width;

if the first and second bit of the second byte have a third value, decoding said remaining bits of the second byte together with the third byte to a sequence of pixels, wherein said remaining bits of the second byte define the sequence length and the third byte defines the pixels color; and if the first and second bit of the second byte have a fourth value, decoding said remaining bits of the second byte together with the third and a following fourth byte, wherein said remaining bits of the second byte and the third byte define the sequence length and the fourth byte defines the pixel color, and wherein said sequence length may exceed the display width.

5. Method according to claim 4, wherein said defining of a pixel color from the first, third or fourth byte and from said first value comprises using a look-up table.

6. Method according to claim 4, wherein the encoded data stream for a video presentation is a separate layer overlaying other video data on the display, further comprising the step of selecting a portion of said separate layer for displaying.

* * * * *

UNITED STATES PATENT AND TRADEMARK OFFICE
CERTIFICATE OF CORRECTION

PATENT NO. : 7,657,109 B2 Page 1 of 1
APPLICATION NO. : 10/561984
DATED : February 2, 2010
INVENTOR(S) : Gandolph et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1077 days.

Signed and Sealed this

Thirtieth Day of November, 2010

David J. Kappos
*Director of the United States Patent and Trademark Office*